(12) United States Patent
Lee et al.

(10) Patent No.: US 12,473,468 B2
(45) Date of Patent: Nov. 18, 2025

(54) ADHESIVE COMPOSITION AND RUBBER REINFORCING MATERIAL

(71) Applicant: KOLON INDUSTRIES, INC., Seoul (KR)

(72) Inventors: Sung Gyu Lee, Seoul (KR); Ok Hwa Jeon, Seoul (KR); Min Ho Lee, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 428 days.

(21) Appl. No.: 17/770,051

(22) PCT Filed: Apr. 8, 2021

(86) PCT No.: PCT/KR2021/004416
§ 371 (c)(1),
(2) Date: Apr. 19, 2022

(87) PCT Pub. No.: WO2021/206471
PCT Pub. Date: Oct. 14, 2021

(65) Prior Publication Data
US 2022/0372347 A1    Nov. 24, 2022

(30) Foreign Application Priority Data

Apr. 9, 2020  (KR) .................. 10-2020-0043565
Apr. 9, 2020  (KR) .................. 10-2020-0043567
Apr. 8, 2021  (KR) .................. 10-2021-0045708

(51) Int. Cl.
*C09J 119/02*    (2006.01)
*B60C 9/00*    (2006.01)
(Continued)

(52) U.S. Cl.
CPC .......... *C09J 119/02* (2013.01); *B60C 9/0042* (2013.01); *B60C 9/005* (2013.01); *C09J 7/50* (2018.01);
(Continued)

(58) Field of Classification Search
CPC .... C09J 119/02; C09J 121/02; C09J 2475/00; C09J 2479/02; C09J 2203/354;
(Continued)

(56) References Cited

U.S. PATENT DOCUMENTS 3,718,518 A * 2/1973 Bock .................... B29D 35/064
156/331.7
3,876,457 A    4/1975 Adams
(Continued)

FOREIGN PATENT DOCUMENTS

CN    1128283 A    8/1996
CN    1946825 A    4/2007
(Continued)

OTHER PUBLICATIONS

International Search Report dated Jul. 22, 2021.
TW Search Report.

*Primary Examiner* — Jennifer A Gillett
(74) *Attorney, Agent, or Firm* — Harvest IP Law, LLP

(57) ABSTRACT

The present invention relates to an adhesive composition including a latex (A), a polyurethane (B), an amine-based adhesion promoter (C), and a water-containing solvent (G). The composition is eco-friendly, has a low risk of fire, and has excellent adhesive strength.

15 Claims, 2 Drawing Sheets

(51) Int. Cl.
  *C09J 7/50* (2018.01)
  *C09J 11/06* (2006.01)
  *D02G 3/02* (2006.01)
  *D02G 3/28* (2006.01)
  *D02G 3/48* (2006.01)
  *D06M 15/572* (2006.01)
  *D06M 15/693* (2006.01)
  *D06M 101/34* (2006.01)
  *D06M 101/36* (2006.01)

(52) U.S. Cl.
  CPC .............. *C09J 11/06* (2013.01); *D02G 3/02* (2013.01); *D02G 3/286* (2013.01); *D02G 3/48* (2013.01); *D06M 15/572* (2013.01); *D06M 15/693* (2013.01); *C09J 2301/312* (2020.08); *D06M 2101/34* (2013.01); *D06M 2101/36* (2013.01); *D10B 2331/02* (2013.01); *D10B 2331/021* (2013.01); *D10B 2505/022* (2013.01)

(58) Field of Classification Search
  CPC ... C09J 109/08; C09J 7/50; C09J 11/06; C09J 2301/312; C09J 2421/00; C09J 2421/006; C09J 9/00; C08L 75/06; C08L 75/04; C08K 5/20; C08K 5/3462; C08K 5/1515; C08K 5/17; B60C 9/0042; B60C 9/005; B60C 9/00; D02G 3/48; D02G 3/02; D02G 3/286; D10B 2505/022; D10B 2331/02; D10B 2331/021; D06M 15/572; D06M 15/693; D06M 2101/34; D06M 2101/36; D06M 13/11; D06M 13/395
  See application file for complete search history.

(56) References Cited

U.S. PATENT DOCUMENTS

| | | | |
|---|---|---|---|
| 6,136,123 A * | 10/2000 | Kaido | .............. C08J 5/128 156/123 |
| 2005/0234165 A1* | 10/2005 | Schaal | .............. B60C 1/0016 524/495 |
| 2015/0314644 A1 | 11/2015 | Grassi | |
| 2015/0315410 A1 | 11/2015 | Bas | |
| 2017/0073466 A1* | 3/2017 | Kusano | .............. D01F 6/70 |
| 2020/0010741 A1 | 1/2020 | Kim | |
| 2020/0361250 A1* | 11/2020 | License | .............. B60C 13/002 |

FOREIGN PATENT DOCUMENTS

| | | | | |
|---|---|---|---|---|
| CN | 110520495 A | 11/2019 | | |
| CN | 110809517 A | 2/2020 | | |
| JP | H11286876 A | 10/1999 | | |
| JP | 2003221787 A | 8/2003 | | |
| JP | 2003253568 A | 9/2003 | | |
| JP | 2005272592 A | 10/2005 | | |
| JP | 2011236534 A | 11/2011 | | |
| JP | 2012224962 A | 11/2012 | | |
| JP | 2020506994 A | 3/2020 | | |
| KR | 1020170018912 A | 2/2017 | | |
| KR | 20180110986 A | 10/2018 | | |
| KR | 1020180110986 A | 10/2018 | | |
| WO | 2010125992 A1 | 11/2010 | | |
| WO | 2018182229 A1 | 10/2018 | | |
| WO | WO-2020178191 A1 * | 9/2020 | ............ | B29D 30/38 |

* cited by examiner

[FIG. 1]
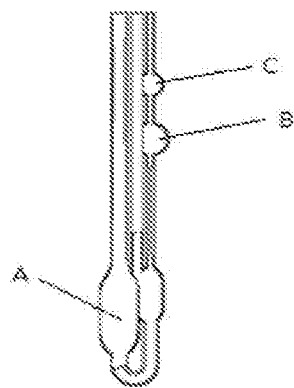
[FIG. 2]
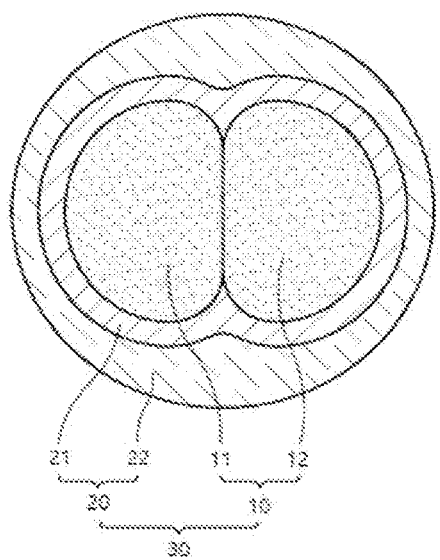

【FIG. 3】
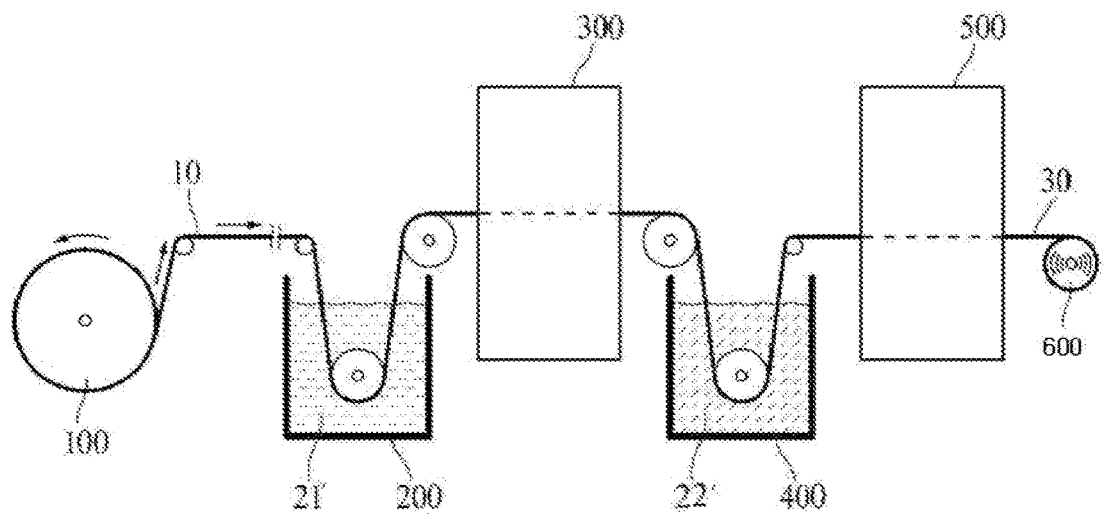
【FIG. 4】
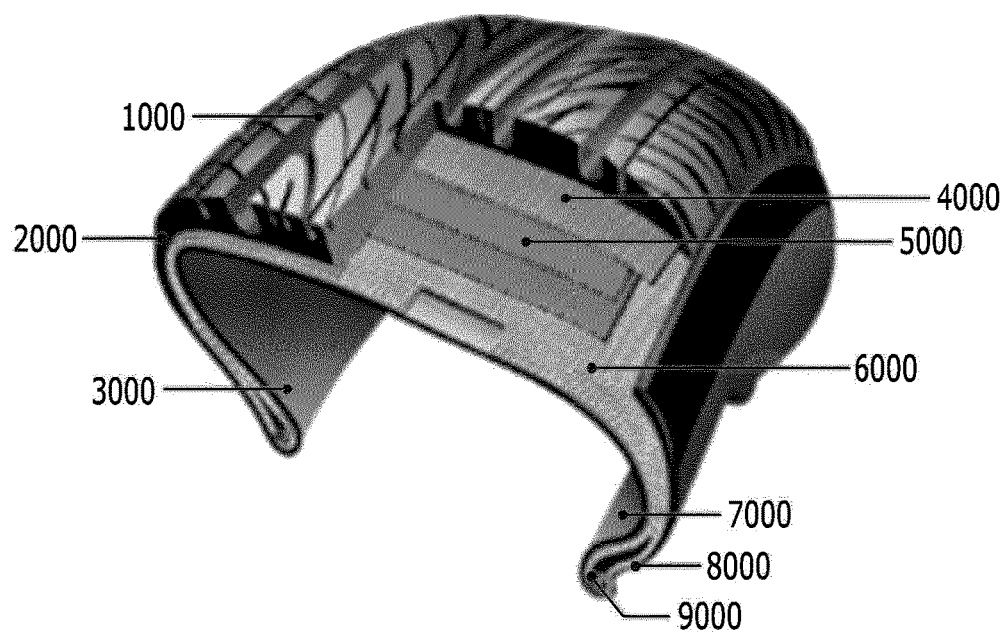

ADHESIVE COMPOSITION AND RUBBER REINFORCING MATERIAL

CROSS REFERENCE TO RELATED APPLICATION(S)

This application is a National Stage of International Application No. PCT/KR2021/004416 filed on Apr. 8, 2021 claiming the benefit of Korean Patent Application Nos. 10-2020-0043567 and 10-2020-0043565 filed on Apr. 9, 2020, and Korean Patent Application No. 10-2021-0045708 filed on Apr. 8, 2021 in the Korean Intellectual Property Office, each of which is incorporated herein by reference in its entirety.

TECHNICAL FIELD

The present invention relates to an adhesive composition, and a rubber reinforcing material. More particularly, the present invention relates to an adhesive and a rubber reinforcing material that can be used for rubber composites such as tires.

BACKGROUND ART

Fiber reinforcing material is used for reinforcing the strength and the like of rubber structures. For example, in a rubber tire, polyester fiber, polyamide fiber, aromatic polyamide fiber, polyvinyl alcohol fiber and the like can be used as a reinforcing material. And, since adhesiveness to rubber may not be good depending on the fiber, methods of improving the adhesiveness between rubber and fiber by coating the surface of the fiber with an adhesive have been proposed. For example, in order to improve the adhesive strength between the polyester fiber for a tire cord (also referred to as a "raw cord") and the rubber for a tire, an adhesive is coated onto the polyester fiber.

Conventionally, resorcinol-formaldehyde (RF) or a component derived therefrom was mainly used as the adhesive for the above application. However, RF containing phenols, resorcinol, and formaldehyde known as a carcinogen is harmful to ae human body, and may occur additional costs for follow-up management and post-treatment of adhesive waste liquids containing RF.

Meanwhile, dipping, spraying or the like may be considered as the method of coating the adhesive composition onto the fiber reinforcing material. In the manufacturing process of the cord to which the above method has been applied, each component constituting the adhesive composition must be uniformly mixed and dispersed in the solvent contained in the composition. Further, even after the composition in which each component has been uniformly mixed and dispersed is dipped or sprayed, it is important that the composition can be uniformly coated in an appropriate amount onto the surface of the fiber reinforcing material (e.g., raw cord). This is because the adhesive strength is not ensured if the components constituting the adhesive composition are not sufficiently mixed or the flowability of the composition becomes very high due to the excessive use of the solvent.

DETAILED DESCRIPTION OF THE INVENTION

Technical Problem

It is an object of the present invention to provide an eco-friendly adhesive composition that does not contain resorcinol-formaldehyde ("RF") components.

It is another object of the present invention to provide an adhesive composition having excellent adhesive strength.

It is another object of the present invention to provide an adhesive composition having excellent coating processability.

It is yet another object of the present invention to provide a rubber composite and a rubber reinforcing material formed by using the adhesive. All of the above and other objects of the present invention can be solved by the present invention which is described in detail below.

Technical Solution

According to the present invention, there are provided an adhesive composition comprising a latex (A), a polyurethane (B), an amine-based adhesion promoter (C), and a water-containing solvent (G), and satisfying a predetermined viscosity; a rubber reinforcing material comprising the adhesive composition or a cured product thereof, and a fiber cord; and a rubber composite comprising the rubber reinforcing material.

Hereinafter, an adhesive according to a specific embodiment of the present invention, a rubber reinforcing material manufactured by using the same, and the like will be described.

In one embodiment, the present invention relates to an adhesive composition.

The composition may include water ($H_2O$) as a solvent or dispersion medium for the adhesive composition or the individual components contained in the composition. For example, in consideration of the danger of fire, the harmfulness to human bodies, securing dispersibility of the components of the composition, and the like, in the present invention, an excessive amount of water may be used in the composition (for example, the content of water excluding a solid content in the total composition is about 40% by weight or more, or 50% by weight or more). Unless otherwise defined, the term "solid content" as used herein may mean the content of an active (or residue) component (which may be a solid form) that remains after evaporating a water or a liquid component (e.g., solvent) for the composition or each component contained in the composition. The conditions for evaporation of water or liquid component (e.g., solvent) are not particularly limited, but for example, the warming (heating) conditions in the range of 70 to 100° C. for about 0.5 to 3 hours may be applied.

In this regard, the present inventors have found that when the adhesive composition contains an excessive amount of water or solvent, for example, the composition contains an excess of solvent, such as water with a content of 40% by weight or more, 50% by weight or more, or 60% by weight or more, and a solid content occupying the other content, there is a problem that the viscosity of the adhesive composition is lowered and also sufficient adhesive strength cannot be secured, thereby completing the present invention.

Accordingly, the composition according to the present invention includes a latex (A), a polyurethane (B), an amine-based adhesion promoter (C), and a water-containing solvent (G), wherein a relative viscosity measured at room temperature using an Ubbelohde viscometer satisfies the range of 2.50 to 3.00.

As used herein, the term "room temperature" refers to a natural temperature particularly without cooling or heating, and may mean, for example, a temperature in a range of 15 to 30° C. Specifically, within the above temperature range, the room temperature may be a temperature of 17° C. or more, 19° C. or more, 21° C. or more, or 23° C. or more, and 29° C. or less or 27° C. or less.

Further, unless otherwise stated herein, the temperature at which the numerical value evaluation of the properties is performed may be a room temperature.

The "relative viscosity'" refers to the ratio of the viscosity (viscosity property) of the composition to the viscosity (viscosity property) of the reference solvent, and the reference solvent used at the time of measuring the relative viscosity may be water (e.g., demineralized water or pure water). Specifically, the relative viscosity (RV) can be calculated by measuring the time ($T_1$) required for the composition to pass through a predetermined scale range of the Ubbelohde viscometer, and the time ($T_0$) required for water (e.g. demineralized water) to pass through the scale range of the same size, and then dividing $T_1$ by $T_0$. The relative viscosity calculated by $T_1$ and $T_0$, which are measured by the same viscometer under the same conditions, can be treated as a dimensionless constant. More details will be described in Experimental Example 1 below with reference to FIG. 1.

Specifically, the lower limit of the relative viscosity of the composition may be, for example, 2.51 or more, 2.52 or more, 2.53 or more, 2.54 or more, 2.55 or more, 2.56 or higher, 2.57 or more, 2.58 or more, 2.59 or more, 2.60 or more, 2.61 or more, 2.62 or more, 2.63 or more, 2.64 or more, 2.65 or more, 2.66 or more, 2.67 or more, 2.68 or more, 2.69 or more, or 2.70 or more. And, the upper limit of the relative viscosity of the composition may be, for example, 2.95 or less or 2.90 or less, more specifically, 2.89 or less, 2.88 or less, 2.87 or less, 2.86 or less, 2.85 or less, 2.84 or less, 2.83 or less, 2.82 or less, 2.81 or less, 2.80 or less, 2.79 or less, 2.78 or less, 2.77 or less, 2.76 or less, 2.75 or less, 2.74 or less, 2.73 or less, 2.72 or less, or 2.71 or less.

When the relative viscosity is less than the above range, there is a problem that as the low molecular weight polymers formed in the process of preparing and curing the composition are transferred to an adherend, the adhesive strength is reduced. Accordingly, it may not provide sufficient physical properties (e.g., mechanical strength, etc.) suitable for the purpose of use. Further, when the relative viscosity is low, the flowability is relatively large and thus, a sufficient coating layer may not be formed on the adherend. Further, for example, when the relative viscosity exceeds the above range, there is a problem that as the cohesive force between the high molecular weight polymers formed in the process of preparing and curing the composition increases, it becomes difficult for the adhesive to be uniformly distributed (or coated) on the adherend and thus, the adhesive strength is reduced. Accordingly, it may not provide sufficient physical properties (e.g., mechanical strength, etc.) suitable for the purpose of use.

As a result, the adhesive composition satisfying the relative viscosity range provides excellent adhesive strength, makes it possible to secure proper pick up, and improves processability and productivity in the manufacture and application of adhesives, as shown in the Experimental Examples below.

All components of the composition described below may be selected and used within a range of content that can satisfy the viscosity of the entire composition without being contrary to the present invention.

(A) Latex Component (A) Latex is a component used in consideration of the use of the composition. Specifically, the adhesive composition can be used for an adherend such as a rubber composite or a rubber reinforcing material, but when latex is used, it can be advantageous in securing affinity, miscibility, or adhesive strength with an adherend. In some cases, the latex component contained in the adhesive composition may be selected in the same manner as the rubber component contained in the adherend.

The type of latex that can be used in the composition is not particularly limited as long as it can satisfy the viscosity of the entire composition described above without being contrary to the present invention.

In one embodiment, the latex may include a natural rubber latex, a vinyl-pyridine latex (hereinafter, referred to as "VP latex"), such as vinyl-pyridine-styrene-butadiene copolymer latex, a styrene-butadiene-based copolymer latex, an acrylic acid ester-based copolymer latex, a butyl rubber latex, a chloroprene rubber latex or a modified latex thereof, etc. In relation to the modified latex, the method of modifying the latex and the specific type of latex are not limited. For example, a modified latex in which vinyl-pyridine-styrene-butadiene-based copolymer is modified with a carboxyl group or the like may be used.

Commercially available latex can also be used as long as it can satisfy the viscosity of the entire composition described above without being contrary to the present invention. For example, as a commercially available VP latex, LM-60 from Denaka, VP-150 from APCOTEX, VB-1099 from Nippon A & L, 5218 from Closlen, 0653 from Closlen or the like may be used.

In one embodiment, a latex component including one or more of the latexes described above may be used in the adhesive composition.

In one embodiment, the latex may be, in a state of being dispersed in a solvent (water or organic solvent), mixed with the other composition component. In this case, the content and type of the solvent used for the latex component may be determined within a range that can satisfy the viscosity of the entire composition described above.

In one embodiment, the adhesive composition may contain 1.0% by weight or more, for example, 1.5% by weight or more of the latex (A) based on the total content of the composition. The content may mean the content occupied by the latex solid content in the composition. Specifically, the lower limit of the content of the latex (A) may be, for example, 2.0% by weight or more, 3.0% by weight or more, 4.0% or more, 5.0% or more, 6.0% by weight or more, 7.0% by weight or more, 8.0% by weight or more, 9.0% by weight or more, 10.0% by weight or more, 11.0% by weight or more, 12.0% by weight or more, 13.0% by weight or more, 14.0% by weight or more or 15.0% by weight or more, and the upper limit thereof may be, for example, 30% by weight or less, 25% by weight or less, 20% by weight or less or 15% by weight or less. When the above range is satisfied, it can be advantageous in securing the affinity, miscibility, and/or adhesive strength of the rubber-containing adherend in which the present adhesive is used.

(B) Polyurethane Component (Polyurethane Dispersion, PUD)

The polyurethane protects or captures the amine-based compound, thereby allowing the adhesive layer (or coating layer) formed by the adhesive composition to be stably cured. In addition, since the polyurethane has excellent affinity with rubber or latex components, it contributes to stably adhering the adhesive composition to an adherend containing rubber, and as a result, makes it possible to secure excellent adhesive strength (especially, heat-resistant adhesive strength) to an adherend.

In one embodiment, a polyurethane dispersed in water ($H_2O$) may be used as the polyurethane component. When polyurethane dispersion in water (polyurethane water dispersion or water-dispersible polyurethane) is used, wear resistance and elasticity specific to polyurethane can also be secured. The content of water contained in the polyurethane dispersion in water component is not particularly limited as long as it can satisfy the viscosity of the entire composition described above without being contrary to the present invention.

For example, the content of water contained in the polyurethane dispersion in water component may be in the range of 40% to 80% by weight (assuming the weight of a single component of the polyurethane dispersion in water is 100% by weight), and the other content may be occupied by polyurethane. In some cases, the polyurethane dispersion in water may contain known trace additives in a small amount of about 10% by weight or less, about 5% by weight or less, or about 1% by weight or less.

The type of polyurethane is not particularly limited as long as it can satisfy the viscosity of the entire composition described above without being contrary to the present invention.

For example, polycarbonate-based urethane, polyester-based urethane, polyacrylic-based urethane, polytetramethylene-based urethane, polycaprolactone-based urethane, polypropylene-based urethane, polyethylene-based urethane or the like may be used. In addition, one or more of those listed above may be used.

In one embodiment, the molecular weight of the polyurethane may be in the range of 250,000 to 350,000. Unless otherwise specified, the "molecular weight" as used herein may be a weight average molecular weight (Mw) measured using a GPC (Gel Permeation Chromatograph).

Specifically, the lower limit of the weight average molecular weight (Mw) of the polyurethane may be, for example, 255,000 or more, 260,000 or more, 265,000 or more, 270,000 or more, 275,000 or more, 280,000 or more, 285,000 or more, 290,000 or more, 295,000 or more, 300,000 or more, or 305,000 or more. And, the upper limit of the weight average molecular weight (Mw) of the polyurethane may be, for example, 345,000 or less, 340,000 or less, 335,000 or less, 330,000 or less, 325,000 or less, 320,000 or less, 315,000 or less, 310,000 or less, 305,000 or less, or 300,000 or less. When the above molecular weight range is satisfied, it is advantageous in securing the viscosity of the entire adhesive composition described above, and as a result, it is possible to secure adhesive strength of the adhesive, fatigue resistance, abrasion resistance, and elasticity of the rubber reinforcing material or the like.

The method of preparing the polyurethane dispersion in water is not particularly limited as long as the range of the weight average molecular weight is satisfied. For example, as in Preparation Example 1 described below, the polyurethane dispersion in water can be prepared by a process in which a prepolymer having units derived from polyol, diol and isocyanate is neutralized with a neutralizing agent, and the neutralized prepolymer is stirred with distilled water to carry out water dispersion, and then reacted with a chain extender.

As described above, the types of polyol, diol, and isocyanate used for forming urethane are not particularly limited as long as they satisfy the range of the weight average molecular weight of the polyurethane.

For example, a diol such as 1,6-HD or 1,4-EG may be used, and as the polyol, a polyester-based polyol or a polyether-based polyol other than a diol may be used. Further, diisocyanate or polyisocyanate may be used as the isocyanate, and these can be aliphatic or aromatic isocyanates.

In one embodiment, the polyurethane may have a unit derived from a polyester-based polyol having a weight average molecular weight (Mw) of 5,000 or less. Specifically, the upper limit of the weight average molecular weight of the polyester-based polyol used for forming the polyurethane may be, for example, 4,500 or less, 4,000 or less, 3,500 or less, 3,000 or less, 2,500 or less, or 2,000 or less, and the lower limit thereof may be, for example, 500 or more, 1,000 or more, or 1,500 or more. When the above range is satisfied, it can be advantageous in adjusting the weight average molecular weight of polyurethane to the range described above, and obtaining the effect due to the use of polyurethane.

In one embodiment, the adhesive composition may contain 0.5% by weight or more of the polyurethane (B) based on the total content of the composition. The content may mean the content occupied by the polyurethane solid content in the composition. Specifically, the lower limit of the content of the polyurethane may be, for example, 1.0% by weight or more, 1.5% by weight or more, or 2.0% by weight or more, and the upper limit thereof may be, for example, 9.0% by weight or less, for example, less than 9.0% by weight, 8.5% by weight or less, 8.0% by weight or less, 7.5% by weight or less, 7.0% by weight or less, 6.5% by weight or less, 6.0% by weight or less, 5.5% by weight or less, 5.0% by weight or less, 4.5% by weight or less, 4.0% by weight or less, 3.5% by weight or less, 3.0% by weight or less, 2.5% by weight or less or 2.0% by weight or less.

In one embodiment, considering the viscosity range of the entire composition, the solid content of the polyurethane that satisfies the above-described molecular weight in the composition may be in a range of 1.0% to 5.0% by weight.

When the content range is satisfied, the effect due to the use of the corresponding composition can be sufficiently exhibited. For example, when the content of polyurethane is less than the above range, the effect due to the use of polyurethane is insignificant, and the viscosity may be lowered. Further, when the content of the polyurethane exceeds the above range, the viscosity of the adhesive can be excessively increased and the adhesive strength can be reduced.

(C) Amine-Based Adhesion Promoter Component

The amine-based adhesion promoter (C) can not only participate in the curing of the composition to form a stable coating layer on the adherend, but also improve the problem of a reduction of the adhesive strength that exhibits while containing excessive water in the composition.

Specifically, in the present invention, in consideration of the decrease in viscosity due to the use of polyurethane dispersion in water (B) and an excessive amount of solvent (G), it includes an amine-based adhesion promoter having a long chain structure. Since the amine-based adhesion promoter having a long chain structure can form a higher molecular weight (compared to the case where the amine-based adhesion promoter is not used) in the process of preparing and curing a composition containing an excessive amount of a solvent (e.g., water), the cohesive force of the molecule can be secured at an appropriate level. Thereby, a stable adhesive coating layer can be formed on the adherend.

As a result, excellent adhesive strength and sufficient physical properties (e.g., mechanical strength, etc.) suitable for the purpose of use can be provided.

In one embodiment, a fatty acid amide is used as the amine-based adhesion promoter (C). Although there is no particular limitation, the fatty acid amide may be a reaction product formed by a reaction (e.g., dehydration condensation) of a fatty acid ($C_1$) and an amine compound ($C_2$).

In relation to the amine-based adhesion promoter (C), the "fatty acid" may mean a carboxylic acid with a long aliphatic chain which is either saturated or unsaturated. At this time, the number of carbon atoms in the aliphatic chain of the fatty acid may be in a range of 6 to 30. Specifically, the number of carbon atoms in the aliphatic chain may be, for example, 8 or more, 10 or more, 12 or more, or 14 or more, and 28 or less, 26 or less, 24 or less, 22 or less, or 20 or less. The long chain included in fatty acids imparts a long chain structure to the amine-based adhesion promoter and contributes to providing excellent adhesive strength and physical properties.

In one embodiment, the fatty acid ($C_1$) may be a saturated fatty acid that does not have a double bond within the aliphatic chain. As described above, the number of carbon atoms in the chain is not particularly limited as long as it is in a range of 6 to 30. Examples of the saturated fatty acids that can be used include caprylic acid ($CH_3(CH_2)_6COOH$), capric acid ($CH_3(CH_2)_8COOH$), lauric acid ($CH_3(CH_2)_{10}COOH$), myristic acid ($CH_3(CH_2)_{12}COOH$), palmitic acid ($CH_3(CH_2)_{14}COOH$), stearic acid ($CH_3(CH_2)_{16}COOH$), arachidic acid $CH_3(CH_2)_{18}COOH$), behenic acid ($CH_3(CH_2)_{20}COOH$), lignoceric acid ($CH_3(CH_2)_{22}COOH$), serotic acid ($CH_3(CH_2)_{24}COOH$), and the like. In addition, one or more of the fatty acids listed above may be used together in the formation of an amine-based adhesion promoter.

In one embodiment, considering the long-chain structure of fatty acids, myristic acid ($CH_3(CH_2)_{12}COOH$), palmitic acid ($CH_3(CH_2)_{14}COOH$), stearic acid ($CH_3(CH_2)_{16}COOH$) or arachidic acid $CH_3(CH_2)_{18}COOH$) may be used. In addition, one or more of the fatty acids listed above may be used together in the formation of an amine-based adhesion promoter.

In relation to the amine-based adhesion promoter (C) in the present invention, the "amine compound" may mean not only ammonia, but also a compound in which the hydrogen atom of ammonia is substituted with an organic group. The type of the organic group is not particularly limited.

In one embodiment, in relation to the amine-based adhesion promoter (C), the "amine compound" may be a diamine. When diamine is used, the amine-based adhesion promoter (C) may be a fatty acid bisamide.

In one embodiment, the diamine may be an alkylene diamine having 1 to 12 carbon atoms. Although there is no particular limitation, the alkylene diamine may be, for example, ethylene diamine.

In one embodiment, the amine-based adhesion promoter may be represented by the following Chemical Formula 1.

[Chemical Formula 1]

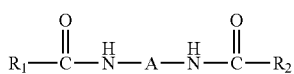

wherein, in Chemical Formula 1, $R_1$ and $R_2$ may be each independently a substituted or unsubstituted aliphatic chain group having carbon atoms in the range of 6 to 30, and A may be a divalent group having carbon atoms in the range of 1 to 12. At this time, the $R_1$ and $R_2$ may be units derived from the fatty acid ($C_1$) described above, and A may be a unit derived from the amine compound ($C_2$) described above.

In one embodiment, $R_1$ and $R_2$ in Chemical Formula 1 may be identical. In another embodiment, $R_1$ and $R_2$ in Chemical Formula 1 may be different.

In one embodiment, A in Chemical Formula 1 may be an alkylene group having 1 to 8, 2 to 6, or 2 to 4 carbon atoms.

In one embodiment, the amine-based adhesion promoter may exist in a solid state or a liquid state. When the amine-based adhesion promoter is in a solid state, it can be mixed with other components of the composition in a state of being dispersed in a solvent (water or organic solvent). In this case, the content and type of the solvent used for the amine-based adhesion promoter component may be determined within the range that can satisfy the viscosity of the entire composition described above.

In one embodiment, the adhesive composition may include a predetermined amount of an amine-based adhesion promoter (C) and an amine-based chain extender (D) described later. For example, the weight ($W_1$) of the amine-based adhesion promoter (C) contained in the adhesive composition may be greater than the weight ($W_2$) of the amine-based chain extender (D). The content ($W_1$, $W_2$) may mean the solid content occupied by the amine-based adhesion promoter (C) and the amine-based chain extender (D), respectively.

Further, in one embodiment, the adhesive composition may have a weight ratio ($W_1/W_2$) between the weight ($W_1$) of the amine-based adhesion promoter (C) and the weight ($W_2$) of the an amine-based chain extender (D) in the range of 1.5 to 10.0. Specifically, the ratio ($W_1/W_2$) may be 2.0 or more, 2.5 or more, 3.0 or more, 3.5 or more, 4.0 or more, 4.5 or more, 5.0 or more, 5.5 or more, 6.0 or more, and 9.5 or less, 9.0 or less, 8.5 or less, 8.0 or less, 7.5 or less, 7.0 or less, 6.5 or less. When the range of the ratio ($W_1/W_2$) is not satisfied, there is a problem that the viscosity range of the composition described above is not satisfied and thus, the adhesive strength is lowered.

In one embodiment, the ratio ($W_1/W_2$) may be in the range of 3.0 to 5.0. Specifically, within the above range, the ratio ($W_1/W_2$) may be 3.5 or more, 4.0 or more, or 4.5 or more. As confirmed in the experiment described below, when the corresponding range is satisfied, more excellent adhesive strength can be provided to the tire cord.

In one embodiment, the adhesive composition may include 1.0% by weight or more of the amine-based adhesion promoter (C) based on the total content of the composition. The content may refer to the solid content occupied by the amine-based adhesion promoter (C). Specifically, the lower limit of the content of the amine-based adhesion promoter (C) may be, for example, more than 1.0% by weight, more specifically 1.5% by weight or more, or 2.0% by weight or more, and the upper limit thereof may be, for example, 5.0% by weight or less, 4.5% by weight or less, 4.0% by weight or less, 3.5% by weight or less, 3.0% by weight or less, 2.5% by weight or less, or 2.0% by weight or less. When the content range is satisfied, the effect due to the use of the corresponding composition can be sufficiently exhibited.

(D) Amine-Based Chain Extender Component

The amine-based chain extender (D) may mean an amine-based compound that does not correspond to the amine-based adhesion promoter (C) described above. That is, the amine chain extender (D) and the amine adhesion promoter (C) have different structures from each other. For example, the amine-based chain extender may be used in the sense of including primary, secondary or tertiary amines that do not have a chain structure derived from the fatty acid described above.

The amine-based chain extender participates in the curing of the composition and allows a stable coating layer to be formed on the adherend. In consideration of its function, the amine-based chain extender (D) may be referred to as an amine-based curing agent. Alternatively, the amine-based adhesion promoter (C) may be referred to as a first amine compound, and the amine-based chain extender (D) may be referred to as a second amine compound.

The type of the amine-based chain extender (D) is not particularly limited if it is different from the amine-based adhesion promoter (C). For example, aliphatic amines, alicyclic amines, aromatic amines and the like can be used.

In one embodiment, a commercially available product may be used as the amine-based chain extender (D). Specifically, Piperazine from DAEJUNG, G640 from Kukdo Chemical, HK511 from Huntsman, and the like may be used.

In one embodiment, the adhesive composition may include an amine-based chain extender (D) so that the weight of the amine-based chain extender (D) is smaller than the weight of the amine-based adhesion promoter (C), as described above.

In one embodiment, the adhesive composition may include the amine-based adhesion promoter (C) and the amine-based chain extender (D) in a predetermined weight ratio ($W_1/W_2$), as described above.

In one embodiment, the adhesive composition may include 3.0% by weight or less of the amine-based chain extender (D) based on the total content of the composition. The content may mean the solid content occupied by the amine-based chain extender (D). Specifically, the upper limit of the content of the amine-based chain extender (D) may be, for example, 2.5% by weight or less, or 2.0% by weight or less, or 1.0% by weight or less. And, the lower limit of the content may be, for example, 0.05% by weight or more, 0.1% by weight or more, 0.2% by weight or more, 0.3% by weight or more, 0.4% by weight or more, or 0.5% by weight or more. When the content range of the amine chain extender described above is satisfied, the effect due to the use of the corresponding composition can be sufficiently exhibited. For example, when the content of the amine-based chain extender (D) is less than the above range, the composition is not sufficiently cured, and when the content exceeds the above range, the adhesive strength may be lowered due to excessive curing.

In one embodiment, based on the content of the entire composition, the sum of the weight ($W_1$) of the amine-based adhesion promoter (C) and the weight ($W_2$) of the amine-based chain extender (D) may be 1.0% by weight or more, specifically more than 1.0% by weight, 1.5% by weight or more, 2.0% by weight or more, 2.5% by weight or more, 3.0% by weight or more, 3.5% by weight or more, 4.0% by weight or more, 4.5% by weight or more, or 5.0% by weight or more. And, the upper limit thereof may be, for example, 8% by weight or less, 7.0% by weight or less, 6.0% by weight or less, 5.0% by weight or less, more specifically, 4.5% by weight or less, 4.0% by weight or less, 3.5% by weight or less, 3.0% by weight or less, 2.5% by weight or less, 2.0% by weight or less, or 1.5% by weight or less. When the content range described above is satisfied, the effect due to the combined use of the amine-based adhesion promoter (C) and the amine-based chain extender (D) can be sufficiently exhibited.

(E) Epoxy Component

In one embodiment, the adhesive composition may further include an epoxy compound (E). The epoxy compound functions as a kind of curing agent, forms a three-dimensional network structure at the time of heat-treating the adhesive, and imparts adhesive strength and layer stability to the coating layer formed from the adhesive composition.

The type of the epoxy compound contained in the adhesive composition is not particularly limited on the assumption that the viscosity range of the entire composition described above is satisfied. For example, glycidyl ether compounds, such as diethylene glycol-diglycidyl ether, polyethylene glycol-diglycidyl ether, polypropylene glycol-diglycidyl ether, neopentyl glycol-diglycidyl ether, 1,6-hexanediol-diglycidyl ether, glycerol-polyglycidyl ether, trimethylolpropane-polyglycidyl ether, polyglycerol-polyglycidyl ether, pentaerythiol-polyglycidyl ether, diglycerol-polyglycidyl ether, sorbitol-polyglycidyl ether; novolac-type epoxy resins such as phenol novolac-type epoxy resin and cresol novolac-type epoxy resin; bisphenol type epoxy resin such as bisphenol A type epoxy resin or bisphenol F type epoxy resin, and the like can be used as the epoxy compound.

In addition, a known or commercially available epoxy resin may be used in the adhesive composition on the assumption that the viscosity range of the entire composition described above is satisfied. For example, as an epoxy resin, EX614B from NAGASE, KETL6000 from Kolon, CL16 from Ipox Chemical, GE500 from Raschig, or the like may be used.

In one embodiment, the equivalent weight (g/eq) of the epoxy resin may be in the range of 120 to 300 g/eq. When the equivalent weight of the epoxy resin is less than 120, the polymerization unit of the epoxy resin is small and thus, it may be difficult to form a network structure. Further, when the equivalent weight of the epoxy resin exceeds 300, the number of epoxy per unit molecule is relatively insufficient and thus, the adhesive strength may be reduced.

In one embodiment, the adhesive composition may include 0.5% by weight or more of the epoxy compound (E) based on the total content of the composition. The content may mean the solid content occupied by the epoxy compound (E) in the composition. Specifically, the lower limit of the content of the epoxy compound (E) may be, for example, 1.0% by weight or more, 2.0% by weight or more, 3.0% by weight or more, 4.0% by weight or more, or 5.0% by weight or more. Further, the upper limit of the content may be, for example, 10% by weight or less, specifically 5.0% by weight or less, 4.0% by weight or less, 3.0% by weight or less, 2.0% by weight or less, or 1.5% by weight or less.

When the content range of the epoxy compound described above is satisfied, the effect due to the use of the corresponding composition can be sufficiently exhibited. For example, if the epoxy compound is used beyond the above range, the adhesive strength can be reduced due to excessive curing of the composition. Further, if the epoxy compound is used below the above range, it is difficult to obtain the effect due to the use of the epoxy compound.

(F) Isocyanate Component

In one embodiment, the adhesive composition may further include isocyanate (F). Isocyanate functions as a kind of crosslinking agent, and forms a three-dimensional network structure at the time of heat-treating the adhesive, thereby imparting adhesive strength and layer stability to the coating layer formed from the adhesive composition.

The type of isocyanate contained in the adhesive composition is not particularly limited, but may be selected in consideration of the viscosity range of the entire composition described above.

For example, a compound containing an aromatic group, that is, an aromatic isocyanate, may be used as the isocyanate. In the case of aromatic polyisocyanate, since a high reaction rate can be secured as compared with non-aromatic polyisocyanate, it may be advantageous in increasing the low viscosity of the aqueous composition.

In one embodiment, the aromatic group contained in the isocyanate compound may be a phenyl group, and as the isocyanate containing such an aromatic group, for example, methylene diphenyldiisocyanate, methylene diphenylpolyisocyanate, polymethylene polyphenylpolyisocyanate or the like may be used.

In one embodiment, the isocyanate compound may be an isocyanate whose terminal is blocked. The blocked isocyanate compound can be prepared, for example, by a reaction of adding a known blocking agent to a polyisocyanate compound. Blocking agents that can be used include, for example, phenols such as phenol, thiophenol, chlorophenol, cresol, resorcinol, p-sec-butylphenol, p-tert-butylphenol, p-sec-amylphenol, p-octylphenol, p-nonylphenol; secondary or tertiary alcohols such as isopropyl alcohol and tert-butyl alcohol; aromatic secondary amines such as diphenylamine and xylidine; phthalic acid imides; lactams such as δ-valerolactam; caprolactams such as ε-caprolactam; active methylene compounds such as malonic acid dialkyl ester, acetylacetone, and acetacetate alkyl ester; oximes such as acetoxime, methyl ethyl ketoxime, and cyclohexanone oxime; basic nitrogen compounds such as 3-hydroxypyridine, acidic sodium sulfite, and the like.

In one embodiment, commercially available aqueous dispersion blocking isocyanates can be used on the assumption that the viscosity range of the entire composition described above is satisfied. For example, IL-6 from EMS, DM-6500 from MEISEI Chemical or the like may be used as an isocyanate according to an embodiment of the present invention.

In one embodiment, the adhesive composition may contain 1% by weight or more of the isocyanate (F) based on the total content of the composition. The content may mean the solid content occupied by the isocyanate (F) in the composition. Specifically, the lower limit of the content of isocyanate (F) may be, for example, 2.0% by weight or more, 3.0% by weight or more, 4.0% by weight or more or 5.0% by weight or more. Further, the upper limit of the content may be, for example, 10% by weight or less, 9.0% by weight or less, 8.0% by weight or less, 7.0% by weight or less, 6.0% by weight or less, or 5.0% by weight or less.

When the content range of the isocyanate described above is satisfied, the effect due to the use of the corresponding composition can be sufficiently exhibited. For example, when the isocyanate is used beyond the above range, the degree of fatigue of the reinforcing material having an adhesive coating layer may be increased due to excessive crosslinking, and physical properties may be deteriorated. Further, when the isocyanate is used below the above range, crosslinking does not occur sufficiently and thus, the physical properties of the adhesive layer can be deteriorated.

In one embodiment, when the epoxy compound (E) is used together, the isocyanate compound (F) can be used so that the epoxy compound and the isocyanate compound are in a weight ratio of 4:1 to 1:4. In another embodiment, the weight of the isocyanate (F) in the total composition may be greater than the weight of the epoxy compound (E) on the assumption that the content range is satisfied. When the above content is satisfied, sufficient crosslinking and proper curing can be performed.

(G) Solvent

In the present invention, the solvent or solvent component may mean a component excluding a component whose content can be measured by the solid content, such as the above-described components (A) to (F) and (H) described later. For example, the solvent or solvent component may be referred to as a non-solid content component.

The adhesive composition of the present invention contains water ($H_2O$) as a solvent component (G). For example, in the present invention, considering the harmfulness to human bodies and the risk of ignition, an organic solvent (e.g., toluene or ethanol, etc.) may not be used, or an excess amount of water may be used as a solvent together with a small amount of an organic solvent.

In one embodiment, the adhesive composition may contain a solvent component in an amount of 40% by weight or more, 45% by weight or more, 50% by weight or more, 55% by weight or more, 60% by weight or more, 65% by weight or more, 70% by weight or more, 75% by weight or more, or 80% by weight or more, and 90% by weight or less, based on the total weight of the composition for which the viscosity is measured. The solvent may be water.

In another embodiment, water may occupy the excess or most of the solvent content. For example, the excess amount (e.g., about 40% by weight or more) of the solvent component contained in the composition may be water, and the remaining content of the solvent excluding water (e.g., 30% by weight or less, 25% by weight or less, 20% by weight or less, 15% by weight or less, 10% by weight or less, or 5% by weight or less) may be occupied by an organic solvent or the like.

That is, according to a specific embodiment of the present invention, the adhesive composition may be regarded as a water-based composition or an aqueous composition.

In one embodiment, water used as a solvent in the adhesive composition may be demineralized water (or pure water).

In one embodiment, based on the total weight of the composition for which the viscosity is measured, the content of water may be 40% by weight or more, 45% by weight or more, 50% by weight or more, 55% by weight or more, 60% by weight or more, 65% by weight or more, 70% by weight or more, 75% by weight or more, or 80% by weight or more. And, the upper limit of the water content may be, for example, 85% by weight or less, 80% by weight or less, 75% by weight or less, 70% by weight or less, 65% by weight or less, or 60% by weight or less.

In one embodiment, the content of water in the total composition may mean the content of water that is mixed as a solvent.

In another embodiment, the content of water in the total composition may include not only the content of water to be mixed as a solvent, but also, for example, the content of solvent (e.g., water or small amount of other organic solvent, etc.) that has been used for other components, for example, solvents used to disperse the polyurethane in component (B).

When the content of the solvent is less than the above range, the dispersibility and miscibility of each component forming the composition are deteriorated, the coating workability is deteriorated, and the adhesive strength of the adhesive layer formed on the adherend may be decreased.

Further, when the content of the solvent exceeds the above range, it is not easy to form an adhesive layer on the adherend and thus, the physical properties required for rubber reinforcing materials or rubber composites are not sufficiently exhibited, the processability is poor as it takes a long time to dry, and the production cost increases.

As described above, in the present invention, components other than the solvent (e.g., components (A) to (F) and/or component (H)) are mixed with the solvent (G) of the above content to form a composition. The content of components other than the solvent may be the solid content of each component. For example, the composition may include 60 to 85% by weight of a solvent and 15 to 40% by weight of a solid content.

(H) Other Components

The adhesive composition of the present invention does not contain resorcinol-formaldehyde or a component derived therefrom. That is, the composition of the present invention may be an RF-free composition. Accordingly, it is possible to provide an adhesive composition that is not harmful to a human body and is eco-friendly, as compared with the prior art in which the RF component was used. Further, the use of such adhesive compositions provides the advantage of reducing the costs for follow-up management and post-treatment.

In addition, a known additive or the like can be included in a small amount on the assumption that it is not contrary to the present invention described above.

As described above, the composition of the present invention may be a mixture of components (A) to (D) and (G), or a mixture in which (E) and/or (F) are additionally mixed thereto. The composition in which the components are mixed may contain each component in the amount of the solid content described above. The use of these compositions may be for coating or adhesion applications.

In another embodiment, the present invention relates to a rubber reinforcing material. The rubber reinforcing material may be, for example, a tire cord in which the above-mentioned adhesive is coated onto a base substrate. The base substrate may be a raw cord containing a fiber component.

Specifically, the tire cord may include a raw cord; and a coating layer formed on the raw cord. The coating layer may be or include a coating layer formed from the above-mentioned adhesive composition, and may be coated in a shape surrounding the raw cord.

The fiber contained in the raw cord are not particularly limited, but may be, for example, polyester fiber, nylon fiber, aramid fiber, cellulose fiber, or glass fiber.

In one embodiment, the raw cord may be a two-ply cord or a three-ply cord formed by twisting two or three fibers.

In one embodiment, the raw code may be a hybrid cord. For example, the raw cord may be a hybrid cord formed by secondarily twisting the primarily twisted yarns having different types of fibers, such as including a primarily twisted aramid yarn and a primarily twisted nylon yarn.

In the case of a hybrid cord formed by secondarily twisting different types of primarily twisted yarns, due to the difference in physical properties (e.g., modulus, etc.) between the primarily twisted yarns, the fatigue resistance may be low and thus, the stability of the tire may be poor.

However, the above-mentioned adhesive composition not only forms an appropriate coating layer on the hybrid raw cord as an adherend, but also imparts excellent adhesive strength between the hybrid raw cord as an adherend and the tire configuration adjacent thereto. Therefore, it is expected that the problem of deterioration of fatigue resistance of tires due to the use of the hybrid cord can be improved to some extent.

In one embodiment, the number of twists of the fiber strands used to form the raw cord may be, for example, 200 TPM (twist per meter) or more, 250 TPM or more, 300 TPM or more, 350 TPM or more, 400 TPM or more, 450 TPM or more, 500 TPM or more or 550 TPM or more. Further, the upper limit of the number of twists may be, for example, 800 TPM or less, 750 TPM or less, 700 TPM or less, 650 TPM or less, 600 TPM or less, 550 TPM or less, 500 TPM or less, 450 TPM or less, or 400 TPM or less.

In one embodiment, the coating layer may be or include a coating layer formed from the above-described adhesive composition. Specifically, the tire cord may be formed by coating the adhesive composition onto the raw cord. The method of coating the adhesive composition is not particularly limited. For example, the coating may be performed by a known dipping or spray type.

In one embodiment, the coating layer contained in the tire cord may include a first coating layer; and a second coating layer formed on the first coating layer. Specifically, the tire cord may sequentially include a raw cord, a first coating layer, and a second coating layer (see FIG. 2).

Although there is no particular limitation, the first coating layer and the second coating layer can have a visible boundary.

In one embodiment, the first coating layer may include the same components as the second coating layer.

In one embodiment, the first coating layer may include a component different from the second coating layer. Specifically, the first coating layer may be formed by dipping the raw cord into a composition for forming a first coating layer (a first coating liquid) containing a reaction-active group imparting component. That is, the first coating layer is formed so as to surround the raw cord or its surface. The type of the reaction-active group imparting component used in the first coating layer is not particularly limited, but for example, the first coating liquid may include one or more compounds selected from epoxy and isocyanate. The solvent component included in the first coating layer forming composition (first coating liquid) is not particularly limited, but water (e.g., demineralized water) may be used in consideration of miscibility with the second coating layer. In addition, the second coating layer is formed by dipping the tire cord (or tire cord precursor) having the first coating layer formed on its surface in the second coating layer forming composition (second coating liquid), and the second coating layer forming composition (second coating liquid) may be the same as the adhesive composition satisfying the above-described viscosity.

In one embodiment, the first coating liquid may include an isocyanate compound and an epoxy compound. In this case, the epoxy compound and the isocyanate compound may be used in a weight ratio of 4:1 to 1:4, 3:1 to 1:3, or 2:1 to 1:2 so that sufficient crosslinking and proper curing are performed.

In another embodiment, the weight of the isocyanate compound in the total composition may be greater than the weight of the epoxy compound, on the assumption that the content range is satisfied.

In another embodiment, the present invention relates to a method for manufacturing a rubber reinforcing material. The method for manufacturing the rubber reinforcing material includes a step of coating a coating liquid onto a base substrate for a rubber reinforcing material and then drying it to form a coating layer.

The method of coating the coating liquid onto the base substrate is not particularly limited, but it may be a spray type or a dipping type, and preferably a dipping type.

In one embodiment, the rubber reinforcing material may be a tire cord.

In one embodiment, the base substrate may be a fiber substrate, specifically a raw cord. Details of the material for forming the raw cord and the like are as described above.

In one embodiment, the coating liquid may be the adhesive composition described above.

In one embodiment, the method may include a step of coating a first coating liquid onto a base substrate for a rubber reinforcing material and then drying it to form a first coating layer on the base substrate; and a step of coating a second coating liquid onto the first coating layer and then drying it to form a second coating layer on the first coating layer.

The method of coating the first coating liquid onto the base substrate or coating the second coating liquid onto the first coating layer is not particularly limited, but for example, it may be a spray type or a dipping type, preferably a dipping type.

In one embodiment, the components of the first coating liquid and the second coating liquid may be identical or different.

For example, the first coating liquid may contain an epoxy compound and an isocyanate compound to impart a reactive group to a fiber substrate or the like. At this time, the epoxy compound and the isocyanate compound may be used in a weight ratio of 4:1 to 1:4, 3:1 to 1:3, or 2:1 to 1:2 so that sufficient crosslinking and proper curing are performed.

In one embodiment, the first coating liquid may contain a solvent. That is, the first coating liquid may include an epoxy compound, an isocyanate compound, and a solvent.

When the content of the solvent is insufficient, the first coating by dipping is not smoothly performed, and when the content of the solvent is too high, the reactive group is not sufficiently imparted to the base substrate for rubber reinforcement. Considering these points, the solvent has a content of 94 to 99% by weight based on the total weight of the first coating liquid, and the mixture of the epoxy compound and the isocyanate compound has a content of 1 to 6% by weight. That is, the first coating liquid contains 1 to 6% by weight of a mixture composed of an epoxy compound and an isocyanate compound and 94 to 99% by weight of a solvent based on the total weight. Although there is no particular limitation, the solvent that can be included or used in the first coating liquid may be water.

In one embodiment, the base substrate for a rubber reinforcing material may be dipped in the first coating liquid and then dried. Specifically, the first coating liquid is coated onto the base substrate for a rubber reinforcing material by dipping. Subsequently, the first coating liquid is dried and cured to form a first coating layer.

In a specific embodiment according to the present invention, the first coating liquid coated onto the base substrate may be dried at a temperature of 100 to 160° C. for 30 to 150 seconds. In addition, in the specific embodiment of the present invention, after the drying, the step of curing the dried first coating liquid at a temperature of 200 to 260° C. for 30 to 150 seconds may be performed. According to the drying and curing, a first coating layer is formed on the base substrate for a rubber reinforcing material. Through the drying and curing under the above conditions, the first coating layer can be stably formed on the base substrate for a rubber reinforcing material.

Although there is no particular limitation, a tension in a range of 0.05 to 3.00 g/d may be applied to the raw cord in the process of dipping, drying, and/or curing. However, another embodiment of the present invention is not limited thereto, and a tension may not be applied to the raw cord.

In one embodiment, the second coating liquid, which is different from the first coating liquid containing an epoxy compound and an isocyanate compound, may be an adhesive composition satisfying the above-mentioned viscosity. Specifically, the second coating liquid may include, at least, a latex (A), a polyurethane dispersion in water (B), an amine-based adhesion promoter (C), and a water-containing solvent (G).

In a specific embodiment according to the present invention, the method may further include a step of forming a second coating layer on a base substrate for a rubber reinforcing material to which a reaction-active group has been imparted, that is, on the first coating layer. The process of forming a second coating layer (e.g., method and condition) can be performed in the same or similar manner as in the formation of the first coating layer.

For example, a second coating liquid may be coated onto the base substrate and the first coating layer, and then the second coating liquid may be dried and cured. Coating of the second coating liquid may be performed by dipping, spraying, or the like.

In a specific embodiment according to the present invention, drying of the second coating liquid may be performed at a temperature of 100 to 160° C. for 30 to 150 seconds. In addition, in a specific embodiment according to the present invention, after the drying, the second coating liquid may be cured at a temperature of 200 to 260° C. for 30 to 150 seconds. By the drying and curing under the above conditions, a second coating layer may be stably formed on the first coating layer. As a result, a rubber reinforcing material having a coating layer is provided.

Although there is no particular limitation, a tension in a range of 0.05 to 3.00 g/d can be applied to the raw cord during the dipping, drying and/or curing process. However, another embodiment of the present invention is not limited thereto, and a tension may not be applied to the raw cord.

A method for manufacturing a rubber reinforcing material according to a specific embodiment of the present invention will be described below with reference to FIGS. 2 and 3.

The raw cord 10 may be manufactured and/or distributed in the state of being wound around the first winder 100. And, the raw cord 10 may be dipped in the first coating liquid 21' contained in the first coating tank 200 and the raw cord 10 is coated with the first coating liquid. During the dipping process, the tension, dipping time and temperature can be appropriately adjusted, which can be appropriately adjusted by a person skilled in the art.

Then, the first coating liquid 21' coated onto the raw cord 10 may be dried and cured. Drying may be performed in a drying device 300. Conditions such as the temperature and time for drying and curing are as described above.

Next, a step of forming the second coating layer 22 on the first coating layer 21 is performed. The step of forming the second coating layer is a step of imparting a rubber-based adhesive composition to the raw cord 10 to which an active group has been imparted by the first coating layer 21. A second coating liquid having a composition different from that of the first coating liquid can be used for forming the second coating layer, and a dipping step can be applied in the same manner as in the formation of the first coating layer.

In order to form the second coating layer 22, the raw cord 10 coated with the first coating layer 21 is dipped in the second coating liquid 22'. The second coating liquid 22' is contained in the second coating tank 400. A second coating liquid 22' is applied on the first coating layer 21 by the dipping. During the dipping step, the tension, dipping time and temperature can be appropriately adjusted, which can be appropriately adjusted by a person skilled in the art.

Then, drying and curing of the second coating liquid 22' are performed. The drying and curing may be performed in a drying device 500. Conditions such as the temperature and time for the drying and curing are as described above.

After the above-mentioned fixing, the second coating layer 22 is formed on the first coating layer 21. The tire cord 30 manufactured in this way is wound around the second winder 600.

As described above, the tire cord 30 having a coating layer formed by dipping may be called a dipped cord.

In yet another embodiment, the present invention relates to a rubber composite. The rubber composite may be, for example, a tire. The tire includes the tire cord described above.

In addition to the tire cord, the tire may have a commonly known configuration, as shown in FIG. 4.

Advantageous Effects

According to a specific embodiment of the present invention, there is provided an adhesive composition that is eco-friendly, has a low risk of fire, has excellent adhesive strength, and is advantageous in improving workability (processability) and reducing costs. In addition, the present invention provide a rubber reinforcement material or a rubber composite which is manufactured by using the adhesive composition, and has improved physical properties (e.g., mechanical strength, fatigue resistance, etc.).

BRIEF DESCRIPTION OF THE DRAWINGS

FIG. 1 schematically shows an Ubbelohde viscometer in order to explain a method for measuring the relative viscosity of the adhesive composition of the present invention.

FIG. 2 schematically shows a cross-section of a tire cord that can be manufactured using the adhesive composition according to an embodiment of the present invention.

FIG. 3 schematically shows the process of manufacturing the tire cord.

FIG. 4 schematically shows a cross section of a tire that can be manufactured using an adhesive composition according to an embodiment of the present invention.

REFERENCE NUMERALS

10: raw cord
11: primarily twisted yarn
12: primarily twisted yarn
20: coating layer
21: first coating layer
21': first coating liquid
22: second coating layer
22': second coating liquid
30: tire cord
100: first winder
200: first coating tank
300: first drying device
400: second coating tank
500: second drying device
600: second winder
1000: tread
2000: shoulder
3000: sidewall
4000: cap ply
5000: belt
6000: body ply or carcass
7000: inner liner
8000: apex
9000: bead Detailed Description of the Embodiments Hereinafter, the action and effect of the invention will be described in more detail with reference to specific examples of the invention. However, these examples are presented for illustrative purposes only, and the scope of the invention is not limited thereto in any sense.

PREPARATION EXAMPLE

Preparation Example 1: Preparation of Polyurethane Dispersion in Water

Polyester-based polyol (weight average molecular weight: about 2,000), diol (1,6-hexane diol), and ionomer (DMBA: dimethylol butanoic acid) were charged into a reactor, and then the mixture was stirred at 75±5° C. for 4 hours. Then, an aliphatic isocyanate dicyclohexymethane-4,4'-diisocyanate) was reacted for 2 hours to prepare a prepolymer. The reaction temperature of the prepared prepolymer was lowered to 60° C., and then a neutralizing agent (TEA: triethanolamine) was added to a solvent to perform neutralization. At this time, a stirrer was used for dispersion, and the dispersion was performed while maintaining the RPM of the stirrer at 1,000 to 1,500. After the dispersion was completed, the solvent (acetone) was removed from the prepolymer through reduced pressure. Then, distilled water was added to the neutralized prepolymer so that the solid content was 60 wt. %, and the mixture was stirred to perform water dispersion. Finally, a chain extender (EDA: ethylene diamine) was added thereto to prepare a polyurethane dispersion in water having a weight average molecular weight of about 308,000.

Preparation Example 2: Preparation of the Compositions of Examples and Comparative Examples Mixing and stirring were performed under the same conditions with the content (wt. %) as in shown Table 1 below, to prepare the compositions of Examples and Comparative Examples. Specifically, each component was mixed and stirred at about 20° C. for 24 hours.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| (A) Latex | 14.7 | 13.7 | 12.7 | 11.7 | 14.7 | 14.7 | 14.7 | 14.7 | 14.7 |
| (B) Polyurethane dispersion in water | 1.8 | 1.8 | 1.8 | 1.8 | 0.8 | 2.8 | 3.8 | 1.8 | 1.8 |
| (C) Amine-based adhesion promoter | 1.8 | 1.8 | 1.8 | 1.8 | 1.8 | 1.8 | 1.8 | 2.8 | 3.8 |
| (D) Amine-based chain extender | 0.4 | 0.4 | 0.4 | 0.4 | 0.4 | 0.4 | 0.4 | 0.6 | 0.85 |
| (E) Epoxy compound | 1.2 | 1.2 | 1.2 | 1.2 | 1.2 | 1.2 | 1.2 | 1.2 | 1.2 |
| (F) Isocyanate | 3.7 | 3.7 | 3.7 | 3.7 | 3.7 | 3.7 | 3.7 | 3.7 | 3.7 |
| (G) Solvent Total content | 76.4 | 77.4 | 78.4 | 79.4 | 77.4 | 75.4 | 74.4 | 75.2 | 73.95 |
| Water (pure water) | 46.8 | 49.2 | 51.7 | 54.2 | 48.4 | 45.1 | 43.4 | 43.7 | 40.7 |

Unit (content): each wt. % of solid content components (A) to (F), and wt. % of solvent (G) which is non-solid content
(A) Latex: VP latex, 0653 from Closlen
(B) Polyurethane dispersion in water: Polyurethane dispersion in water prepared in Preparation Example 1 was used
(C) Amine-based adhesion promoter (primary amine compound): N,N'-ethylenebis (stearamide), a reaction product of ethylenediamine and stearic acid
(D) Amine-based chain extender (secondary amine compound): piperazine
(E) Epoxy compound: EX614B from NAGASE with equivalent weights adjusted to the range of 120 to 300 g/eq
(F) Isocyanate: IL-6 from EMS
(G) Solvent: Non-solid content component containing pure water (demineralized water)

TABLE 2

|  | Comparative Example 1 | Comparative Example 2 | Comparative Example 3 | Comparative Example 4 | Comparative Example 5 | Comparative Example 6 |
|---|---|---|---|---|---|---|
| (A) Latex | 0 | 32 | 14.7 | 14.7 | 14.7 | 14.7 |
| (B) Polyurethane dispersion in water | 1.8 | 1.8 | 0.2 | 10 | 1.8 | 4.5 |
| (C) Amine-based adhesion promoter | 1.8 | 1.8 | 1.8 | 1.8 | 0.5 | 6 |
| (D) Amine-based chain extender | 0.4 | 0.4 | 0.4 | 0.4 | 0.4 | 0.4 |
| (E) Epoxy compound | 1.2 | 1.2 | 1.2 | 1.2 | 1.2 | 1.7 |
| (F) Isocyanate | 3.7 | 3.7 | 3.7 | 3.7 | 3.7 | 3.4 |
| (G) Solvent Total content | 91.1 | 59.1 | 78 | 68.2 | 77.7 | 69.3 |
| Water (pure water) | 83.1 | 4.1 | 49.5 | 33.1 | 50.7 | 29.6 |

Unit (content): each wt. % of solid content components (A) to (F), and wt. % of solvent (G) which is non-solid content
(A) Latex: VP latex, 0653 from Closlen
(B) Polyurethane dispersion in water: Polyurethane dispersion in water prepared in Preparation Example 1 was used
(C) Amine-based adhesion promoter (primary amine compound): N,N'-ethylenebis (stearamide), a reaction product of ethylenediamine and stearic acid
(D) Amine-based chain extender (secondary amine compound): piperazine
(E) Epoxy compound: EX614B from NAGASE with equivalent weights adjusted to the range of 120 to 300 g/eq
(F) Isocyanate: IL-6 from EMS
(G) Solvent: Non-solid content component containing pure water (demineralized water)

Preparation Example 3: Manufacture of raw cord and tire cord Aramid yarn (1,500 de) and nylon yarn (1,260 de) were used to prepare two strands (11, 12) of primarily twisted yarns (Z-direction) having a number of twists of 360 TPM, and then the two strands of primarily twisted yarns were secondarily twisted together (S-direction) with a number of twists of 360 TPM to manufacture a plied yarn (1,500 de A/1,260 de N). The plied yarn thus manufactured was used as a raw cord 10.

A coating layer 20 was formed on the raw cord 10 to manufacture a tire cord 30. Specifically, a raw cord composed of aramid and nylon was dipped in the first coating liquid, and then treated at a drying temperature of 150° C. and a curing temperature of 240° C. for about 1 minute, respectively, to form the first coating layer 21, thereby imparting a reaction-active group to the raw cord. At this time, the first coating liquid was prepared by mixing an epoxy compound and an isocyanate compound, which are a part of the components used in Preparation Example 2, in a weight ratio of about 1:2, together with 97 wt. % of demineralized water.

Then, the adhesive compositions of Examples and Comparative Examples prepared according to Preparation Example 2 (hereinafter, referred to as a "second coating liquid") were applied to the raw cord having the first coating layer formed thereon. Specifically, the raw cord on which the first coating layer was formed was dipped in the second coating liquid, dried and cured to form a second coating layer 22. At this time, the resulting second coating layer was treated at a drying temperature of 150° C. and a curing temperature of 235° C. for about 1 minute, respectively, to perform the drying and curing. The first coating liquid dipping step and the second coating liquid dipping step were continuously performed, and the tension condition at this time was 0.5 g/d. Through the above process, a tire cord 30 was manufactured in the form of a dipped cord.

EXPERIMENTAL EXAMPLE

Experimental Example 1: Measurement of the Relative Viscosity of the Compositions of Examples and Comparative Examples The viscosity of each composition prepared in Preparation Example 2 was measured using an Ubbelohde viscometer after being left in a constant temperature water tank (about 25° C.) for 30 minutes. Specifically, through the following process, a certain amount of demineralized water was put into the Ubbelohde viscometer, and then the viscosity properties of the demineralized water were measured. The viscosity properties of the composition were measured in the same way, and then the relative viscosity was calculated based on the viscosity properties of demineralized water that was already measured. The results are as shown in Table 2 below.

The viscosity measurement process will be described below with reference to FIG. 1.

(1) A sample (composition or demineralized water) was injected into an Ubbelohde viscometer tube A.

(2) The constant temperature water tank was set to 25° C., fixed so that part C was immersed in the water tank, and allowed to stand for 30 minutes.

(3) The sample was set so as to come up to the middle of part C using a pipette filler.

(4) After that, the sample was allowed to flow downward, and the time required for the liquid level of the sample to pass through the upper scale of B and then through the lower scale of B was measured.

(5) The measured time was applied to the following Equation for calculating the relative viscosity, thereby determining the relative viscosity.

<Equation for Calculating Relative Viscosity>

$$\text{Relative Viscosity} = T_1/T_0$$

($T_1$: the time required for the adhesive composition to pass through the upper scale of B and then through the lower scale of B, $T_0$: the time required for demineralized water to pass through the upper scale of B and then through the lower scale of B)

TABLE 3

| | Example 1 | Example 2 | Example 3 | Example 4 | Example 5 | Example 6 | Example 7 | Example 8 | Example 9 |
|---|---|---|---|---|---|---|---|---|---|
| Viscosity (RV) | 2.71 | 2.68 | 2.64 | 2.58 | 2.67 | 2.73 | 2.77 | 2.72 | 2.73 |

TABLE 4

| | Comparative Example 1 | Comparative Example 2 | Comparative Example 3 | Comparative Example 4 | Comparative Example 5 | Comparative Example 6 |
|---|---|---|---|---|---|---|
| Viscosity (RV) | 1.84 | 4.68 | 2.43 | 3.21 | 2.24 | 3.14 |

Experimental Example 2: Confirmation of the Degree of Resin Pick Up

The raw cord manufactured in Preparation Example 3 was dipped in the adhesives (compositions) of Examples and Comparative Examples prepared in Preparation Example 2 for 20 seconds, then rolled up and dried. Specifically, using a tensile tester, the raw cord was dipped in an adhesive solution at a constant speed (about 250 mm/min) and wound up therefrom. Then, the wound raw cord was dried in an oven at 240° C. for 1 minute and 30 seconds.

The degree (or ratio) of resin pick up (RPU, %) was calculated as shown in [Equation 1] below, and the results are shown in Table 3 below.

$$\{(W_b - W_a)/W_a\} \times 100 \quad \text{[Equation 1]}$$

wherein, in Equation 1, $W_b$ is the weight (g) of the raw cord after dipping, and $W_a$ is the weight (g) of the raw cord before dipping.

TABLE 5

| | Example 1 | Example 2 | Example 3 | Example 4 | Example 5 | Example 6 | Example 7 | Example 8 | Example 9 |
|---|---|---|---|---|---|---|---|---|---|
| RPU (%) | 4.9 | 4.7 | 4.5 | 4.2 | 4.8 | 5.2 | 5.5 | 5.2 | 5.4 |

TABLE 6

| | Comparative Example 1 | Comparative Example 2 | Comparative Example 3 | Comparative Example 4 | Comparative Example 5 | Comparative Example 6 |
|---|---|---|---|---|---|---|
| RPU (%) | 2.2 | 8.7 | 3.8 | 6.5 | 3.2 | 6.8 |

As shown in Tables 3 and 4 above, it can be confirmed that the adhesive compositions of Comparative Example 1, Comparative Example 3, and Comparative Example 5 have lower viscosity and higher flowability than those of Examples. When the flowability is excessively high, the resin pick up is low as shown in Table 6. Therefore, the coating layer may not be uniformly formed on the adherend or the surface to be coated, and may not provide sufficient adhesive strength. The comparison results of the adhesive strength using the compositions of Examples and Comparative Examples can be confirmed in Tables 8 and 9 below.

In addition, as shown in Tables 3 and 4, it can be confirmed that the adhesive compositions of Comparative Example 2, Comparative Example 4, and Comparative Example 6 have higher viscosity and lower flowability than those of Examples. If the flowability is excessively low, sufficient mixing between components of the composition is not performed and thus, the adhesive strength may be reduced. The comparison results of the adhesive strength using the compositions of Examples and Comparative Examples can be confirmed in Tables 8 and 9 below.

Experimental Example 3: Evaluation of Adhesive Strength

The adhesive strength per unit area to the tire cord manufactured in Preparation Example 3 was evaluated using the compositions of Examples and Comparative Examples, respectively. The evaluation of the adhesive strength was performed by a method of measuring the adhesive peel strength of the tire cord in according with ASTM D4393.

Specifically, a 0.6 mm thick rubber sheet, a cord paper (tire cord of Preparation Example 3), a 0.6 mm thick rubber sheet, a cord paper (tire cord of Preparation Example 3), and a 0.6 mm thick rubber sheet were sequentially laminated, and vulcanized at 170° C. for 15 minutes under a pressure of 60 kg/cm' to manufacture a sample. Then, the sample was cut to prepare a test specimen having a width of 1 inch. For reference, the rubber sheet has the composition shown in Table 7 below, and is a sheet used for the carcass constituting a tire. By using a laminate using such a rubber sheet, the adhesive strength of the tire cord to the carcass layer can be confirmed.

For the prepared test specimen, a peel test was performed at 25° C. at a rate of 125 mm/min using a universal testing machine (Instron), and the adhesive strength of the tire cord to the carcass layer was measured. The relative magnitude of the measured adhesive strength is shown in Tables 8 and 9 below. At this time, the average value of three time measurements of the loads generated at the time of peeling was calculated as the adhesive strength.

TABLE 7

| Rubber sheet component | Content (weight ratio based on 100 weight parts of natural rubber) |
|---|---|
| Natural rubber | 100 |
| Zinc oxide | 3 |
| Carbon black | 29.8 |
| Stearic acid | 2.0 |
| Pine tar | 7.0 |
| Mercaptobenzothiazole | 1.25 |
| Sulfur | 3.0 |
| Diphenylguanidine | 0.15 |
| Phenylbetanaphthalamine | 1.0 |

TABLE 8

| | Example 10 | Example 11 | Example 12 | Example 13 | Example 14 | Example 15 | Example 16 | Example 17 | Example 19 |
|---|---|---|---|---|---|---|---|---|---|
| Adhesive composition used | Example 1 | Example 2 | Example 3 | Example 4 | Example 5 | Example 6 | Example 7 | Example 8 | Example 9 |
| Adhesive strength (%) | 100 | 97 | 96 | 96 | 95 | 98 | 100 | 99 | 100 |

\* Adhesive composition used: refers to the adhesive composition used at the time of forming the second coating layer
\* Adhesive strength: the results of Example 10 are relatively compared based on 100%

TABLE 9

| | Comparative Example 7 | Comparative Example 8 | Comparative Example 9 | Comparative Example 10 | Comparative Example 11 | Comparative Example 12 |
|---|---|---|---|---|---|---|
| Adhesive composition used | Comparative Example 1 | Comparative Example 2 | Comparative Example 3 | Comparative Example 4 | Comparative Example 5 | Comparative Example 6 |
| Adhesive strength (%) | 54 | 72 | 81 | 82 | 85 | 79 |

\* Adhesive composition used: refers to the adhesive composition used at the time of forming the second coating layer
\* Adhesive strength: the results of Example 10 are relatively compared based on 100%

The invention claimed is:

1. An adhesive composition comprising a latex (A), a polyurethane (B), an amine-based adhesion promoter (C), and a water-containing solvent (G),
   wherein a relative viscosity of the adhesive composition measured at room temperature using an Ubbelohde viscometer satisfies the range of 2.50 to 3.00,
   wherein the composition further comprises an amine-based chain extender (D), wherein a weight (W1) of the amine-based adhesion promoter (C) is greater than a weight (W2) of the amine-based chain extender (D),
   wherein the composition contains 1.0% by weight or more of the amine-based adhesion promoter (C) based on the total weight of the composition,
   wherein a reference solvent used at the time of measuring the relative viscosity is water, wherein a weight ratio (Wi/W2) between the weight (W1) of the amine-based adhesion promoter (C) and the weight (W2) of the amine-based chain extender (D) is in the range of 2.0 to 10,
   wherein the amine-based adhesion promoter (C) is a reaction product of a fatty acid ($C_1$) and an amine compound ($C_2$),
   wherein the amine-based chain extender (D) is a primary, secondary, or tertiary amine that does not have a chain structure derived from a fatty acid and has a structure different from the amine-based adhesion promoter (C).

2. The adhesive composition according to claim 1, wherein the fatty acid ($C_1$) is a saturated fatty acid having an aliphatic chain having carbon atoms in the range of 6 to 30.

3. The adhesive composition according to claim 1, wherein the amine compound ($C_2$) is an alkylene diamine having 1 to 12 carbon atoms.

4. The adhesive composition according to claim 1, wherein the amine-based adhesion promoter (C) is represented by the following Chemical Formula 1:

[Chemical Formula 1]

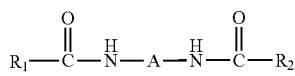

wherein, in Chemical Formula 1, $R_1$ and $R_2$ are each independently a substituted or unsubstituted aliphatic chain group having carbon atoms in the range of 6 to 30, and A is a divalent group having carbon atoms in the range of 1 to 12.

5. The adhesive composition according to claim 1, wherein the composition contains 40% by weight or more of water based on the total weight of the composition.

6. The adhesive composition according to claim 1, wherein the composition contains 1.0 to 30% by weight of the latex (A) based on the total weight of the composition.

7. The adhesive composition according to claim 1, wherein the polyurethane (B) comprises a polyurethane having a weight average molecular weight (Mw) in the range of 250,000 to 350,000.

8. The adhesive composition according to claim 7, wherein the composition contains 0.5 to 9.0% by weight of the polyurethane based on the total weight of the composition.

9. The adhesive composition according to claim 1, wherein the composition further comprises an epoxy compound (E).

10. The adhesive composition according to claim 1, wherein the composition further comprises an isocyanate compound (F).

11. A rubber reinforcing material comprising a raw cord containing fibers; and a coating layer formed on the raw cord,
    wherein the coating layer is formed from the adhesive composition according to claim 1.

12. The rubber reinforcing material according to claim 11, wherein the raw cord is a hybrid cord formed by secondarily twisting two different types of primarily twisted yarns.

13. The rubber reinforcing material according to claim 12, wherein the hybrid cord comprises a primarily twisted aramid yarn and a primarily twisted nylon yarn.

14. The rubber reinforcing material according to claim 11, the rubber reinforcing material sequentially comprises a raw cord; a first coating layer formed on the raw cord; and a second coating layer formed on the first coating layer and formed from the adhesive composition according to claim 1, wherein the first coating layer comprises at least one compound selected from the group consisting of an epoxy and an isocyanate as a reaction-active group imparting component.

15. A rubber composite comprising the rubber reinforcing material according to claim 11.

* * * * *